US011189178B2

(12) United States Patent
Dow et al.

(10) Patent No.: US 11,189,178 B2
(45) Date of Patent: Nov. 30, 2021

(54) REMOTE SENSOR MONITORING USING LED TRANSMISSION (71) Applicant: International Business Machines Corporation, Armonk, NY (US)

(72) Inventors: Eli M. Dow, Wappingers Falls, NY (US); Michael R. Kelly, Wappingers Falls, NY (US); Harry R. Kolar, Scottsdale, AZ (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 381 days.

(21) Appl. No.: 15/481,101

(22) Filed: Apr. 6, 2017

(65) Prior Publication Data
US 2018/0293896 A1 Oct. 11, 2018

(51) Int. Cl.
*G08G 5/00* (2006.01)
*B64C 39/02* (2006.01)

(52) U.S. Cl.
CPC .......... *G08G 5/003* (2013.01); *B64C 39/024* (2013.01); *B64C 2201/12* (2013.01); *B64C 2201/128* (2013.01); *B64C 2201/145* (2013.01); *G08G 5/0034* (2013.01)

(58) Field of Classification Search
CPC ............ G08G 5/003; H04B 10/502; B64C 2201/145; B64C 2201/128; B64C 2201/12; B64C 39/024
See application file for complete search history.

(56) References Cited

U.S. PATENT DOCUMENTS

| 6,960,750 | B2 | 11/2005 | Doane |
| 7,610,122 | B2 | 10/2009 | Anderson |
| 8,909,389 | B2 | 12/2014 | Meyer |
| 2014/0263822 | A1 | 9/2014 | Malveaux |
| 2016/0180144 | A1 | 6/2016 | Tatourian et al. |
| 2016/0328980 | A1* | 11/2016 | Sharma ............... G08G 5/0013 |
| 2017/0003690 | A1* | 1/2017 | Tanahashi ........... G05D 1/0011 |
| 2017/0258005 | A1* | 9/2017 | Cutter ................. A01C 21/005 |

(Continued)

FOREIGN PATENT DOCUMENTS

WO 2005112307 A1 11/2005

OTHER PUBLICATIONS

Adamo, et al., "An Acoustic Method for Soil Moisture Measurement", IEEE Transactions On Instrumentation and Measurement, vol. 53, No. 4, Aug. 2004, pp. 891-898, IEEE. Digital Object Identifier 10.1109/TIM.2004.831126.

(Continued)

*Primary Examiner* — Hunter B Lonsberry
*Assistant Examiner* — Mathew Franklin Gordon
(74) *Attorney, Agent, or Firm* — Cantor Colburn LLP; Teddi Maranzano (57) ABSTRACT Embodiments of the invention are directed to computer-implemented methods, computer systems, and computer program products for remote monitoring of devices. The method includes causing a launch of an unmanned aerial vehicle (UAV). The UAV is instructed to fly a path that is optimized to read optical signals from a set of one or more devices. Data is received from the UAV, the data corresponding to the optical signals read from the set of one or more devices.

14 Claims, 5 Drawing Sheets

(56) References Cited

U.S. PATENT DOCUMENTS

2018/0068567 A1\* 3/2018 Gong .................... H04W 4/022
2018/0129879 A1\* 5/2018 Achtelik ................. G01C 5/00

OTHER PUBLICATIONS

Robotshop, "Soil Moisture Sensor—RobotShop", Accessed Online: Apr. 6, 2017, 2 Pages. URL: http://www.robotshop.com/en/soil-moisture-sensor-sfe.html?gclid=CKnVsY23xcsCFUc2gQod1bgBoQ.
Ünal et al, "A Review on Using Drones for Precision Farming Applications", http://http://tarmek.org//.

\* cited by examiner

REMOTE SENSOR MONITORING USING LED TRANSMISSION

BACKGROUND

The present invention generally relates to the field of computing. More specifically, the present invention relates to improving the transmission of sensor data from remote locations.

Sensors are used to detect a wide variety of conditions. Examples include moisture sensors, weather sensors, and the like. In some instances, one wants the ability to remotely monitor sensors in a cost-effective manner. For example, in agricultural settings, one might want to monitor the moisture level of the soil of a very large area of land. An owner of a large area of land might want to monitor intrusion detection sensors. Without remote monitoring capabilities, one would have to manually check each sensor. With remote monitoring based on the transmission of radio waves, the cost of each sensor might be too high.

SUMMARY

Embodiments of the present invention are directed to a computer-implemented method for remote monitoring of devices. The method includes causing a launch of an unmanned aerial vehicle (UAV). The UAV is instructed to fly a path that is optimized to read optical signals from a set of one or more devices. Data is received from the UAV that corresponds to the optical signals read from the set of one or more devices.

Embodiments of the present invention are further directed to a computer system for remote monitoring of devices. The computer system includes a memory and a processor system communicatively coupled to the memory. The processor system is configured to perform a method. The method includes causing a launch of an unmanned aerial vehicle (UAV). The UAV is instructed to fly a path that is optimized to read optical signals from a set of one or more devices. Data is received from the UAV that corresponds to the optical signals read from the set of one or more devices.

Embodiments of the present invention are further directed to a computer program product for remote monitoring of devices. The computer program product includes a computer-readable storage medium having program instructions embodied therewith. The program instructions are readable by a processor system to cause the processor system to perform a method. The method includes causing a launch of an unmanned aerial vehicle (UAV). The UAV is instructed to fly a path that is optimized to read optical signals from a set of one or more devices. Data is received from the UAV that corresponds to the optical signals read from the set of one or more devices.

Additional features and advantages are realized through techniques described herein. Other embodiments and aspects are described in detail herein. For a better understanding, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated

DETAILED DESCRIPTION

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description are not intended to be limiting in this respect. Accordingly, a coupling of entities can refer to either a direct or an indirect connection.

Additionally, although a detailed description of a system is presented, configuration and implementation of the teachings recited herein are not limited to a particular type or configuration of device(s). Rather, embodiments are capable of being implemented in conjunction with any other type or configuration of devices and/or environments, now known or later developed.

Furthermore, although a detailed description of usage with specific devices is included herein, implementation of the teachings recited herein are not limited to embodiments described herein. Rather, embodiments are capable of being implemented in conjunction with any other type of electronic device, now known or later developed.

At least the features and combinations of features described in the immediately present application, including the corresponding features and combinations of features depicted in the figures amount to significantly more than implementing a method of remote monitoring of sensors. Additionally, at least the features and combinations of features described in the immediately following paragraphs, including the corresponding features and combinations of features depicted in the figures go beyond what is well understood, routine and conventional in the relevant field(s).

While some embodiments of the present invention are described with respect to agricultural embodiments and/or soil monitoring sensors, it should be understood that embodiments are not so limited. Embodiments of the present invention can be used with any type of remote monitoring of devices.

Sensors are used in a wide variety of environments. Exemplary sensors can include those used in agriculture, such as moisture monitoring and nutrients monitoring. In such agricultural use cases, the condition of soil can be of importance to a farmer who is attempting to maximize the growth of his crops. Soil conditions can be highly localized (due to hills and other topography). For example, a row of crops at the bottom of a hill could receive more water than rows of crops that are on the hill, due to the natural run-off of water the collects at the bottom of the hill. For this reason, a farmer might want as many soil sensors as possible instead of relying on few distantly spaced sessensors.

A potential problem with existing sensor technologies is the cost of installing and monitoring the sensors. If the sensors do not have remote monitoring capabilities, a farmer has to check each individual sensor. The result would be that the farmer either not use as many sensors as would be desirable or that the farmer has to spend many man-hours in gathering sensor data.

Existing remote monitoring techniques are typically wired or use radio waves. A wired system would require the use of many meters of wiring. The result is a great expenditure of finances or man-hours in placing sensors. A wireless system using radio waves presents other issues. Wireless technology can be expensive because each sensor would need to be connected to a transceiver. In addition, farms can be located in remote areas, that can be far from cellular data services, rendering 4G, LTE, 3G and other wireless transmission impractical. WiFi has a range that is too small to be used on a typical farm.

Turning now to an overview of the aspects of the invention, one or more embodiments of the present invention address the above-described shortcomings by providing a novel method and system to handle the remote monitoring of devices. The devices to be monitored are coupled to light emitting diodes (LEDs) that are used to broadcast information related to the conditions being sensed by the devices. The devices are monitored through the use of a device that is configured to remotely read the LEDs. In one or more embodiments, the remote reading of the devices occurs is through the use of remotely piloted unmanned aerial vehicles, also known as UAVs, unmanned aircraft systems (UAS), remotely piloted aerial vehicles (RPAV), remotely piloted aircraft systems (RPAS) or drones.

Figure 1:
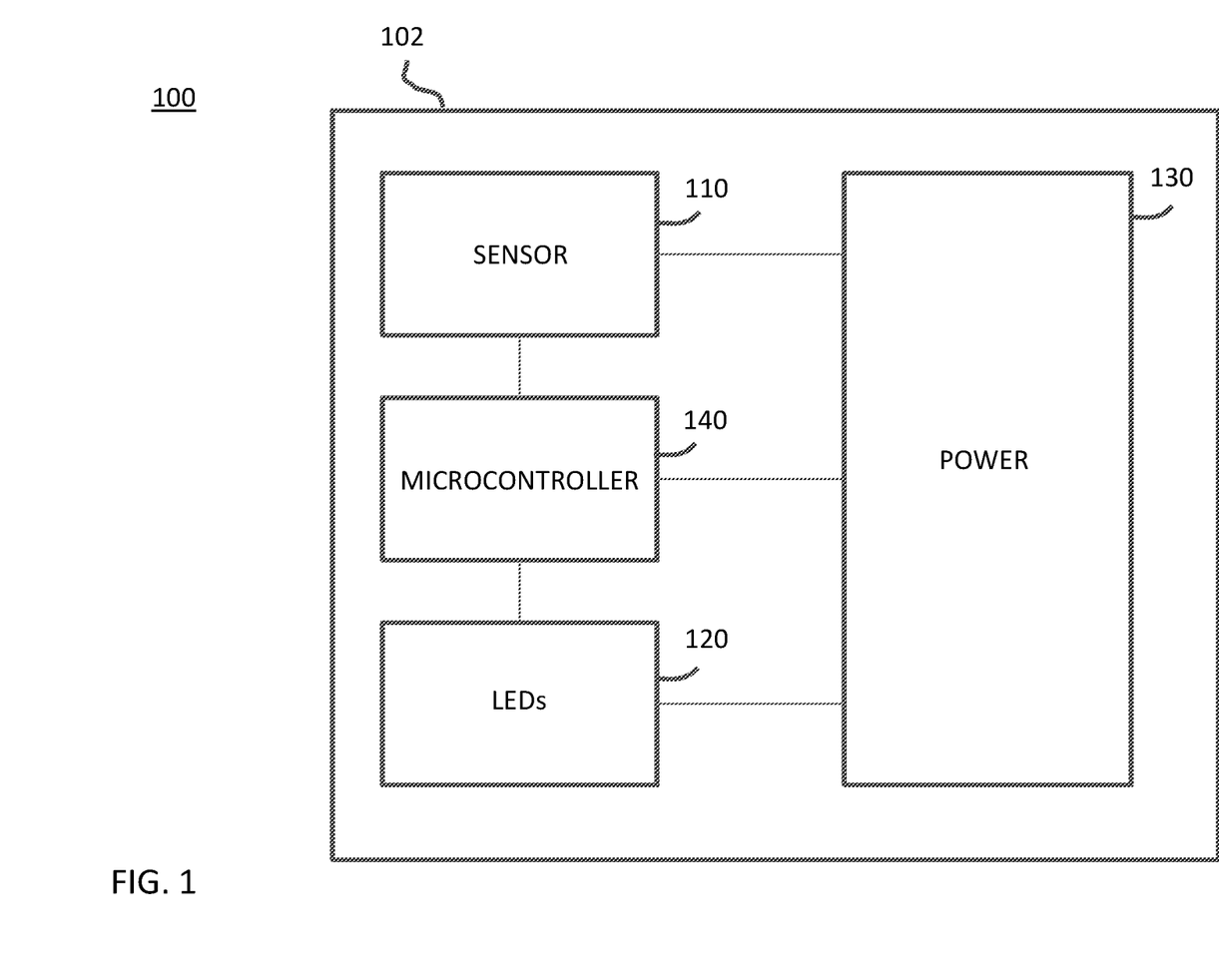
FIG. 1 depicts a block diagram of a system according to embodiments of the invention.

Turning now to a more detailed description of aspects of the present invention, FIG. 1 depicts a a block diagram of an exemplary device 100. One or more exemplary devices 100 can include a sensor that is coupled to one or more LEDs. Device 100 can include a sensor 110 in electrical communication with one or more LEDs 120. In some embodiments, the LEDs 120 can be infrared LEDs. The use of infrared LEDs as opposed to LEDs that shine in the visible spectrum results in less light pollution, because the farmer's field will not be full of LEDs that may be blinking. In addition, the transmission distance of infrared LEDs can be longer.

Both sensor 110 and LEDs 120 are mounted in a common housing 102. In a soil-sensing embodiment, the device can be weighted such that the device is more likely to land on the bottom of the housing. The device can also have a probe or other mechanism (not shown) that is coupled to the sensor. The probe can be used to embed in the soil to help sensor 110 gather data.

Sensor 110 can be any type of sensor. In some embodiments, sensor 110 is a soil moisture sensor that is optimized to detect an amount of water in the soil. In such a manner, it can be determined if additional watering should be applied. Moisture data can be sensed in any one of a variety of different manners. In some embodiments, probes can be used to detect moisture in the soil. In some embodiments, sound waves can be propagated through the soil to measure the speed of sound in the soil to determine a moisture level. Other types of moisture sensors can be used. In addition, other types of sensors can be used. Sensors can be based on electromagnetic soil properties. These properties are generally influenced by soil texture, salinity, organic matter, and moisture content. In some cases, other soil properties such as residual nitrates or soil pH can be predicted using these sensors. Conversely, the sensors might be any optical sensor (one that uses light reflectance to characterize soil). These sensors can measure near-infrared, mid-infrared, or polarized light reflectance. Optical sensors can predict clay, organic matter, and moisture content. The sensors can be mechanical sensors used to estimate the mechanical resistance of soil (often related to compaction). These sensors use a mechanism that penetrates or cuts through the soil and records the force measured by strain gauges or load cells. In the future, with advances in miniaturization or sensor advancement, compact variants composed of an ion-selective electrode (with glass or polymer membrane or ion-sensitive field effect transistor). These electrodes detect the activity of specific ions (nitrate, potassium, or hydrogen in case of pH). Airflow sensors may be used to measure soil air permeability on the go (via the pressure required to squeeze a given volume of air into the soil at fixed depth as compared to several soil properties) distinguishing between various soil types, moisture levels, and soil structure/compaction. Other sensors can be used to monitor nutrients in the soil.

It should be understood that while certain embodiments describe the use of device 100 in agriculture, device 100 can be used in any type of environment in which it is desirable to receive data from remotely mounted sensors. Such embodiments can include monitoring levels of a lake or reservoir, monitoring livestock, monitoring food levels, monitoring parking spaces, weather monitoring, intrusion detection, security, and the like.

Both sensor 110 and LEDs 120 are coupled to a power source 130. Power source 130 can take one of a variety of different forms. In some embodiments, power source 130 can be one or more batteries. In some embodiments, power source 130 can be a solar cell.

While sensor 110 can be located at the bottom of housing 102 (or coupled to a probe that is on the bottom of housing 102), LEDs 120 can be located at the top of housing 102. Being located at the top of housing 102 allows LEDs 120 can be remotely monitored from above.

Within housing 102 can be a microcontroller 140. Microcontroller 140 is electrically coupled to sensor 110, LEDs 120, and power supply 130. Microcontroller 140 can be configured to read data from sensor 110 for broadcast by LEDs 120. Microcontroller 140 can be configured to perform a variety of different functions. For example, sensor 110 can be configured to have an analog output (such as an increasing voltage indicating an increasing moisture level). Microcontroller 140 can convert the analog output to a digital value, then use the digital value for broadcast by LEDs 120. Microcontroller 140 can include a clock such that the time of each sensor reading can be noted. Microcontroller 140 can include memory such that microcontroller 140 can format output to whatever format is chosen for transmission by LEDs 120.

While the term "microcontroller" is being used to refer to microcontroller 140, it should be understood that any type of electronic circuit that can perform the above-described functions can be used, including one or more central processor units, application specific integrated circuits (ASIC), digital to analog converters, amplifiers, and the like. It should be understood that there can be additional electronic equipment present within housing 102 that are not illustrated. Such equipment can include resistors, capacitors, inductors, transistors, diodes, relays, crystals, integrated circuits, power regulators, amplifiers, wiring, and the like.

A wide variety of techniques can be used for the broadcasting of data from sensor 110 via LEDs 120. A simple technique can be used that merely involved blinking LEDs 120 based on the data from sensor 110. For example, if the sensor is a moisture sensor, the blinking rate of LEDs 120 can have a default value to indicate that device 100 is operating normally. The blinking rate can increase to show a lack of moisture in the soil. Other broadcasting techniques could be used, including those that currently exist and those developed in the future. Even a technique as old as Morse code could be used, as well as one of a variety of consumer infrared standards including, but not limited to, RECS-80, RC-5, and RC-6.

Device 100 can be inexpensive. Thus, a farmer can be more likely to have enough devices to monitor all of his crops, even over a large area. The cost of device 100 can be low enough that a farmer might not want to retrieve devices from the field before plowing or replanting. By weighting device 100, each device 100 can be tossed into a location, lessening the time need to place each device 100. The weighting forces a probe at the bottom of the housing (not shown) to be in contact with soil while placing LEDs 120 in a position to be read.

In other embodiments, device 100 can be mounted on a pole or other extension that places device 100 at a height such that device 100 will not be obscured by the crops, plants, or other chattel being monitored.

Figure 2:
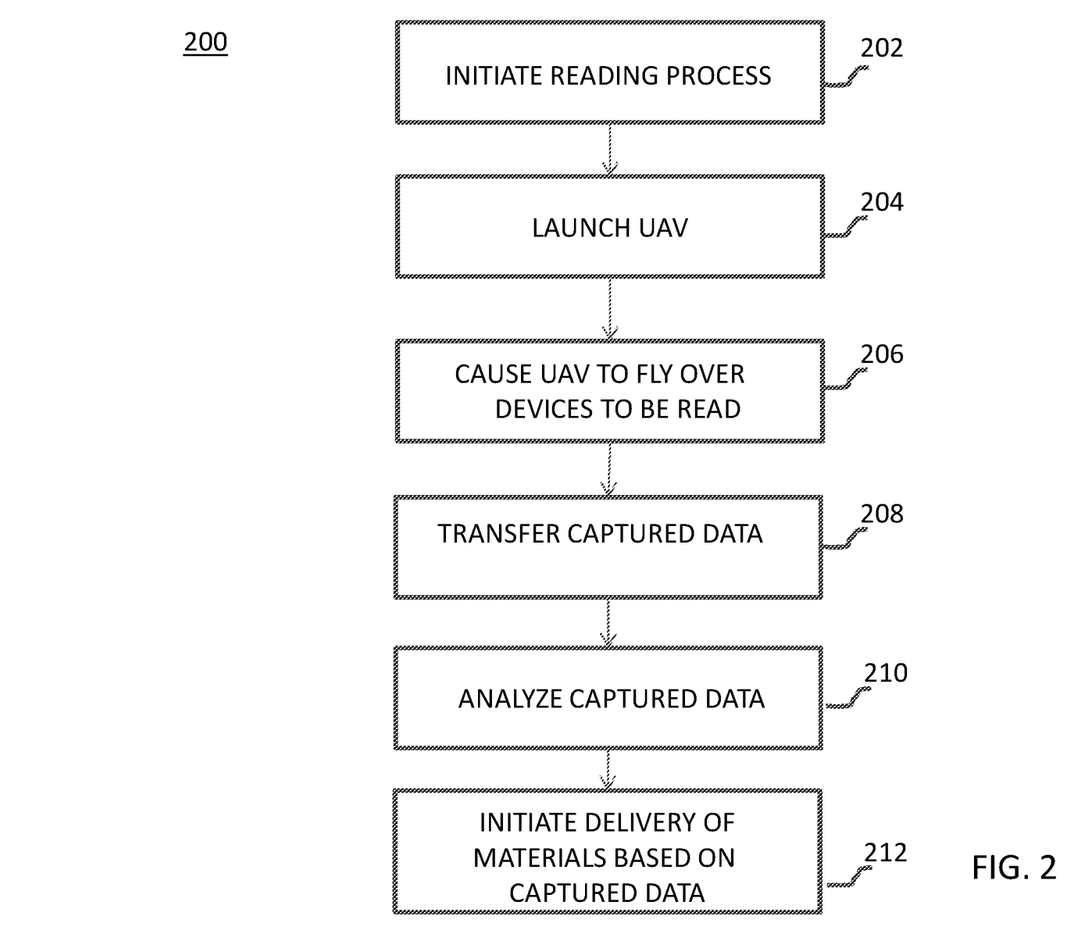
FIG. 2 depicts a flow diagram illustrating a methodology according to embodiments of the invention.

A flowchart illustrating method 200 is presented in FIG. 2. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped. In one or more embodiments, method 200 is performed by a processor as it is executing instructions.

Method 200 presents a method to read data from device 100. As described above, device 100 broadcasts data using LEDs. While data can be captured and monitored using one of a variety of different techniques, certain techniques can be more effective if there are many devices spread over a large area.

At block 202, a reading of device 100 (or a set of devices 100) is initiated. Such a reading can be initiated in one of a variety of different manners. For example, readings can be initiated manually in a periodic manner (such as every hour or multiple of hours or daily). In other embodiments, the initiating of a reading can be started by a computer system, such as computer system 300 described below. In some embodiments, a UAV can have a "docking station," where the UAV is placed between flights. While at the docking station to be charged or transfer data, the UAV can receive an instruction to begin method 200.

At block 204, a UAV is launched. One of a variety of different UAVs can be used. In some embodiments, a UAV can process signals received from global positioning satellites (GPS) or other satellite navigation system, such as GLONASS. In such an embodiment, the UAV can determine its location and fly a pre-determined path, using the GPS to guide the UAV. The UAV can be in any type of configuration. Common UAV types include single-rotor helicopters, double-rotor helicopters, multi-rotor helicopters, fixed wing aircraft, and the like. The UAV is configured to have one or more detectors that are sensitive to UV light. The UAV can also be configured to have a memory such that data that is received can be stored.

The path is configured to read LEDs from each device 100 that is in a field of plants or other crops. An exemplary path is set forth with respect to FIG. 5.

Figure 5:
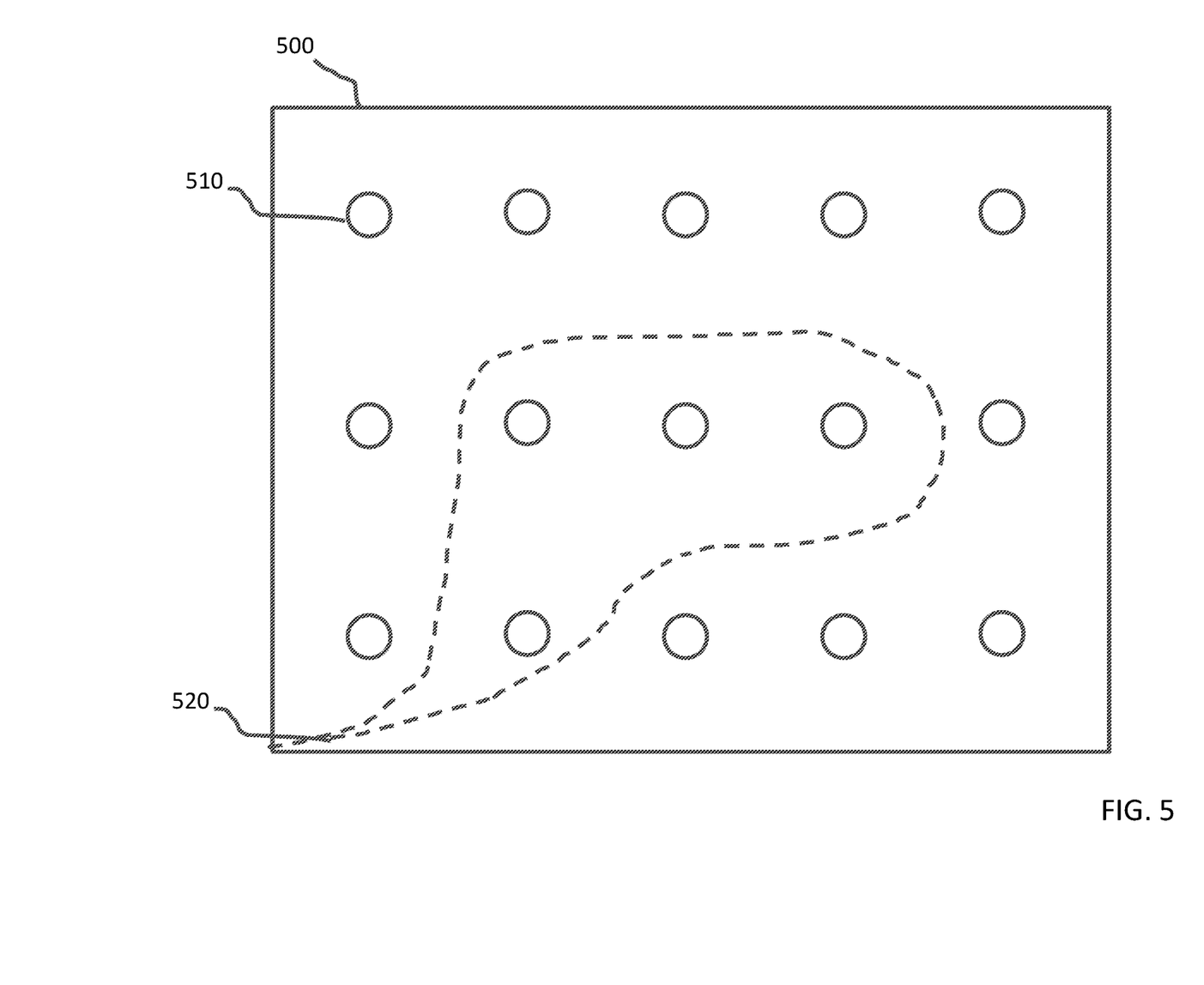
FIG. 5 is a diagram illustrating an exemplary use case in accordance with embodiments of the invention.

With reference to FIG. 5, an exemplary plot of land 500 is illustrated. Plot 500 represents an area in which plants, trees, vines, or other crops are planted. One wishes to monitor moisture in the plot of land 500 to determine if water, fertilizer, or other nutrients are desired. Crops are often planted in rows. Therefore, a set of devices 510 can be placed also be placed in rows, adjacent to the crops. Each device of the set of devices 510 can be similar to device 100 described above.

Flight path 520 shows an exemplary flight path that can be taken by a UAV (not shown). Flight path 520 can be chosen such that the UAV is able to detect light output from each device of the set of devices 510. Other flight paths can be possible. It should be noted that plot of land 500 can be very large, such as dozens or hundreds of hectares or more.

As can be seen from FIG. 5, while flight path 520 would be relatively easy to traverse for a UAV. A four-propeller UAV has a top speed of approximately 20 meters per second, so it can traverse a 100-hectare plot of land in five to ten minutes.

The use of a UAV allows broader coverage of the field than would otherwise be possible. A stationary detector would only be able to detect optical signals from a device 510 that is relatively close to the detector. A detector mounted on a truck or tractor that drives around a perimeter of the field would have more capability, but would also not be able to read signals from a device 510 that is located in a middle of the field. A tractor or other vehicle that is configured to travel through a field has the ability to read signals from a larger proportion of sensors. However, such a configuration can result in damage to crops. A device that is operated by a person walking through a field would have the ability to read each device 100 but could require a long period of time to complete.

The use of a UAV addresses each of the above-described concerns. Returning to the method of FIG. 2, the UAV is configured to fly over an entire field at an altitude low enough to be able to read every device, yet high enough to avoid damaging crops or encountering any obstructions (block 206). In addition, the UAV can be pre-programmed to fly on a path that is optimized to detect signals from each device (such as path 520). This results in less manpower being used because the UAV can be started, flown, and stopped without human intervention. UAV transfers data to a computer system, such as computer system 300 (block 208). This can be accomplished in one of a variety of different manners. In one or more embodiments, wireless protocols (such as WiFi, Bluetooth, or cellular technologies) can be used to transfer data from the UAV to the external system. In one or more embodiments, the data can be transferred while the UAV is traveling along the path. In other embodiments, the data is transferred in the docking station. The computer system analyzes the data that was captured (block 210) and determines if there are any areas of the field that requires extra attention. The analysis can include a comparison to known locations of devices. The known locations can be determined from previous flights or from a database of installed devices. By comparing captured readings to known locations, one or more embodiments can determine if a device is inoperable.

In agricultural embodiments, conditions that can be sensed include the need for water, the need for plant food, the need for specific nutrients, and the life. External system can be coupled to irrigation, sprinkler, or fertilizer systems and initiate the delivery of an object, such as water or nutrients, according to the readings (block 212).

Figure 3:
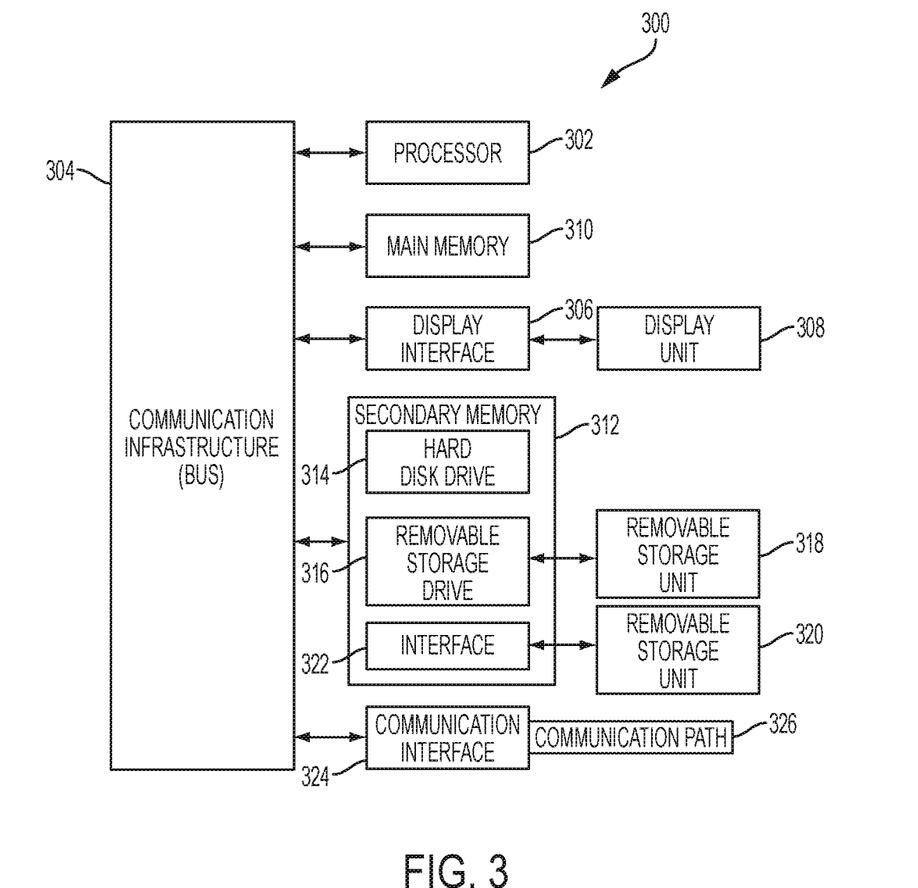
FIG. 3 depicts a computer system capable of implementing hardware components according to embodiments of the invention.

FIG. 3 depicts a high-level block diagram of a computer system 300, which can be used to interface with a UAV in one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, crossover bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid-state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
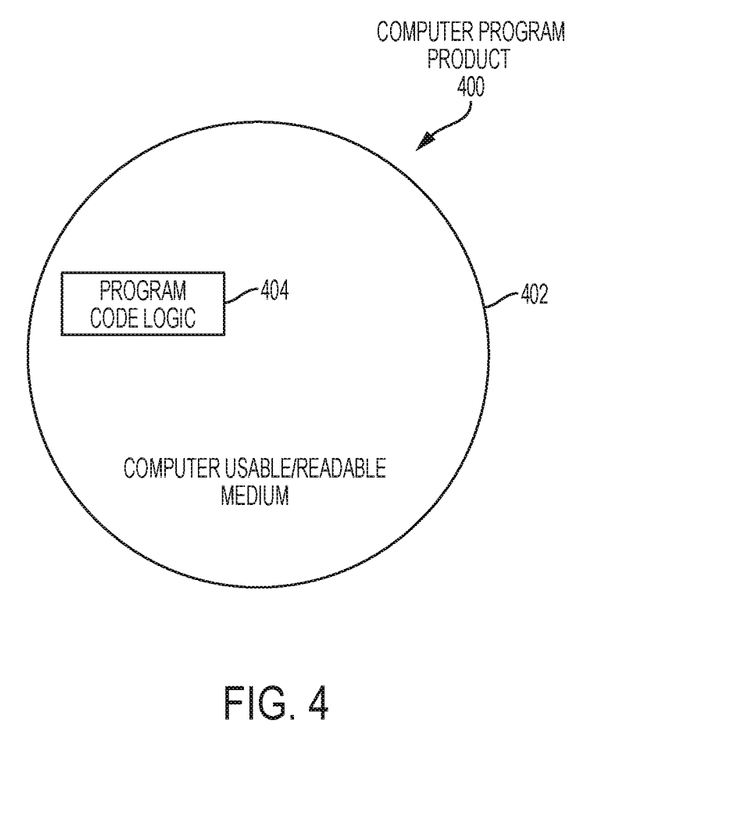
FIG. 4 depicts a diagram of a computer program product according to embodiments of the invention.

Referring now to FIG. 4 a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

What is claimed is:

1. A computer-implemented method for remote monitoring of devices, the method comprising:

causing, by a processor, a launch of an unmanned aerial vehicle (UAV);

instructing, by the processor, the UAV to fly a path at altitude to traverse a set of devices distributed on a ground wherein the path is configured based on positions of the set of devices on the ground to optimize remote reading of optical signals broadcast from the set of devices distributed on the ground, wherein the optical signals are indicative of measurements captured by sensors of each device of the set of devices distributed on the ground;

receiving, by the processor, data from the UAV corresponding to the optical signals read from the set of devices distributed on the ground;

comparing the data received from the UAV to a set of known locations to associate a reading from a device of the set of devices to a location from the set of known locations; and using the set of known locations to find an inoperable device in the set of devices.

2. The computer-implemented method of claim 1 wherein the UAV is configured to use satellite navigation to fly the path.

3. The computer-implemented method of claim 1 further comprising:

causing delivery of an object based on data from the UAV.

4. The computer-implemented method of claim 3 wherein:

each device of the set of one or more devices is configured to read nutrient levels of soil;

the object being delivered is a nutrient configured to correct nutrient levels of the soil.

5. The computer-implemented method of claim 1 wherein:

the optical signals from the set of devices is transmitted via one or more infrared light emitting diodes.

6. A computer system for remote monitoring of devices, the system comprising:

a memory; and a processor system communicatively coupled to the memory;

the processor system configured to:

causing a launch of an unmanned aerial vehicle (UAV);

instructing the UAV to fly a path at altitude to traverse a set of devices distributed on a ground wherein the path is configured based on positions of the set of devices on the ground to optimize remote reading of optical signals broadcast from the set of devices distributed on the ground, wherein the optical signals are indicative of measurements captured by sensors of each device of the set of devices distributed on the ground;

receiving data from the UAV corresponding to the optical signals read from the set of devices distributed on the ground;

comparing the data received from the UAV to a set of known locations to associate a reading from a device of the set of devices to a location from the set of known locations; and using the set of known locations to find an inoperable device in the set of devices.

7. The computer system of claim 6 wherein the UAV is configured to use satellite navigation to fly the path.

8. The computer system of claim 6 wherein the instructions further comprise:

causing delivery of an object based on data from the UAV.

9. The computer system of claim 8 wherein:

each device of the set of devices is configured to read nutrient levels of soil;

the object being delivered is a nutrient configured to correct nutrient levels of the soil.

10. The computer system of claim 6 wherein:

the optical signals from the set of devices is transmitted via one or more infrared light emitting diodes.

11. A computer program product comprising:

a computer-readable storage medium having program instructions embodied therewith, the program instructions readable by a processor system to cause the processor system to perform a method comprising:

causing a launch of an unmanned aerial vehicle (UAV);

instructing the UAV to fly a path at altitude to traverse a set of devices distributed on a ground wherein the path is configured based on positions of the set of devices on the ground to optimize remote reading of optical signals broadcast from the set of devices, wherein the optical signals are indicative of measurements captured by sensors of each device of the set of devices distributed on the ground;

receiving data from the UAV corresponding to the optical signals read from the set of devices distributed on the ground;

comparing the data received from the UAV to a set of known locations to associate a reading from a device of the set of devices to a location from the set of known locations; and using the set of known locations to find an inoperable device in the set of devices.

12. The computer program product of claim 11 wherein the UAV is configured to use satellite navigation to fly the path.

13. The computer program product of claim 11 wherein the program instructions further comprise:

causing delivery of an object based on data from the UAV.

14. The computer program product of claim 13 wherein:

each device of the set of one or more devices is configured to read nutrient levels of soil;

the object being delivered is a nutrient configured to correct nutrient levels of the soil.

* * * * *